United States Patent [19]

London et al.

[11] 4,023,553
[45] May 17, 1977

[54] COMBINATION CHARCOAL LIGHTER AND MINIATURE GRILL

[76] Inventors: Charles E. London, 4976 Skyline Road South; William R. Tomison, 260 W. Vista South, both of Salem, Oreg. 97302; Roscoe C. Nelson, III, 2108 SW. Laurel St., Portland, Oreg. 97201

[22] Filed: July 28, 1975

[21] Appl. No.: 599,373

[52] U.S. Cl. .......................... 126/25 B; 126/25 R; 126/162
[51] Int. Cl.² .......................................... A47J 37/00
[58] Field of Search ............ 126/25 B, 25 R, 25 A, 126/59.5, 9.2, 162; 110/1 F; 99/449, 450

[56] References Cited
UNITED STATES PATENTS

| | | | |
|---|---|---|---|
| 246,561 | 8/1881 | Sassinot et al. .................. | 126/25 R |
| 1,311,551 | 7/1919 | Campbell ........................... | 126/162 |
| 3,018,771 | 1/1962 | Curtis ................................ | 126/25 A |
| 3,167,040 | 1/1965 | Byars, Sr. et al. ................. | 110/1 F |
| 3,430,621 | 3/1969 | Doty ................................. | 126/162 X |
| 3,851,639 | 12/1974 | Beddoe ............................. | 126/25 R |
| 3,903,866 | 9/1975 | Polinski ............................ | 126/25 B |

Primary Examiner—William F. O'Dea
Assistant Examiner—Harold Joyce
Attorney, Agent, or Firm—Oliver D. Olson

[57] ABSTRACT

A charcoal lighter comprises a tubular housing with draft openings in the lower portion and a grate loosely positioned within. Hanger rods pivotably support the grate removably from the upper edge of the housing in a raised, horizontal position for holding charcoal to be lit, and one of the rods is releasable from the housing edge to pivot the grate to a lowered, declining position for depositing the lit charcoal onto a grill base. A perforate plate is installable on the upper edge of the tubular housing, allowing its use as a miniature grill, and when so installed it locks the releasable hanger rod to the housing edge, to prevent inadvertent release of the grate to the lowered position.

6 Claims, 9 Drawing Figures

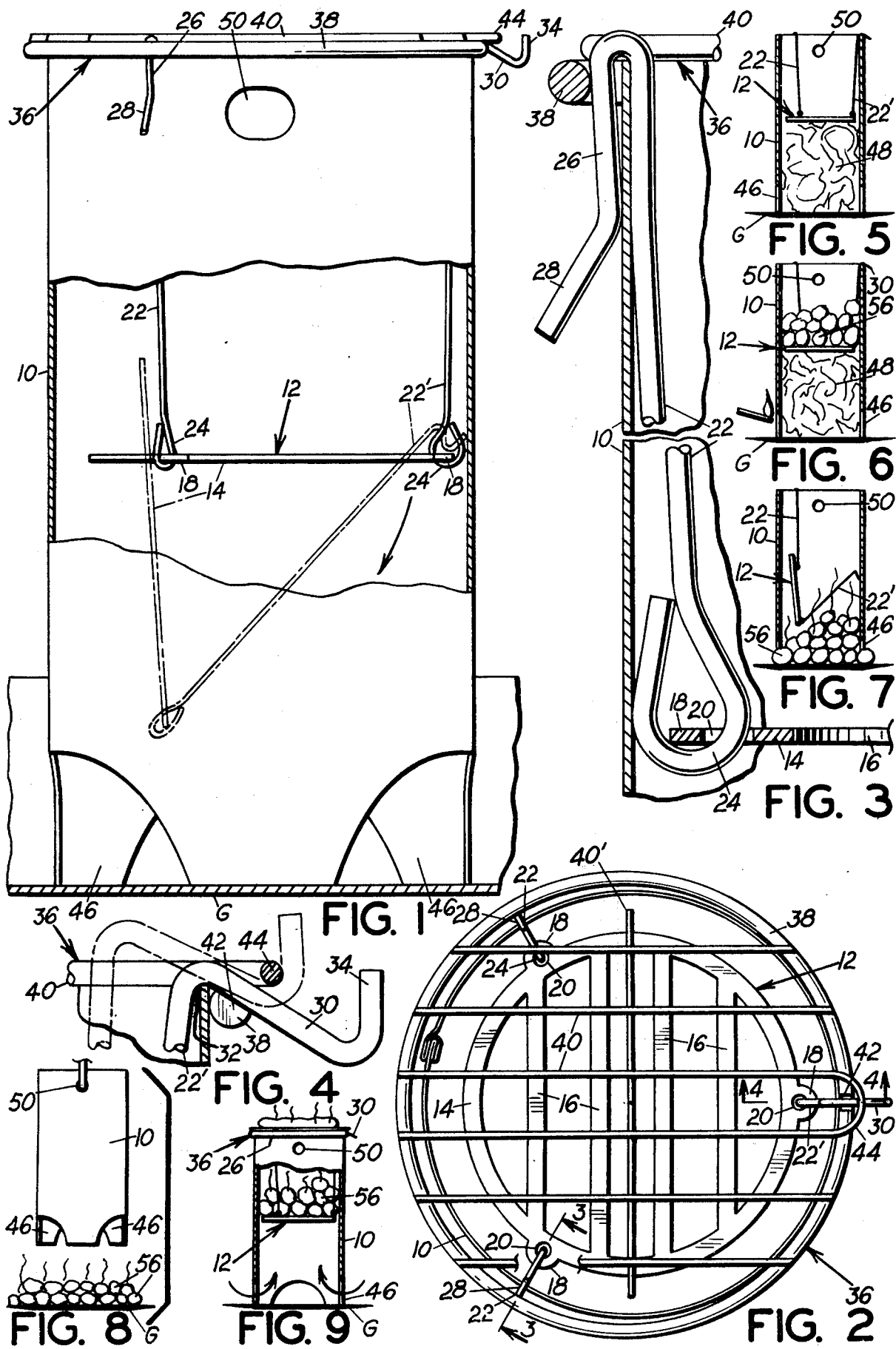

COMBINATION CHARCOAL LIGHTER AND MINIATURE GRILL

BACKGROUND OF THE INVENTION

This invention relates to charcoal lighters for use in the rapid ignition of charcoal. It relates particularly to a structural combination which accommodates use either as a charcoal lighter or as a miniature grill.

Charcoal lighters of this general type are known in the art. However, they are characterized by structures which require manual manipulations of hot components which present the hazard of burning the user, and which structures do not insure against accidental discharge of hot charcoal from the supporting grate when the grill is in use.

SUMMARY OF THE INVENTION

In its basic concept, the charcoal lighter of this invention comprises a tubular housing having grate means supported therein by peripherally spaced hanger means attached removably to the upper edge of the tubular housing and arranged, upon detachment of one of the hanger means from said upper edge, to pivot the grate means from a horizontal, charcoal-supporting position to a declining, charcoal-discharging position.

It is by virtue of the foregoing basic concept that the principal objective of this invention is achieved; namely, to overcome the aforementioned disadvantages and limitations of charcoal lighters of the prior art.

Another object of this invention is to provide a charcoal lighter of the class described including grill means arranged to be installed on top of the housing and including locking means for securing the one hanger means against detachment from the upper edge of the housing when the grate means is in the horizontal, charcoal-supporting position.

A still further object of this invention is to provide a charcoal lighter of the class described which is of simplified construction for economical manufacture.

The foregoing and other objects and advantages of this invention will appear from the following detailed description, taken in connection with the accompanying drawing of a preferred embodiment.

BRIEF DESCRIPTION OF THE DRAWINGS

FIG. 1 is a side elevation, partially broken away, of the charcoal lighter embodying the features of this invention.

FIG. 2 is a plan view of the charcoal lighter as viewed from the top of FIG. 1.

FIG. 3 is a fragmentary, foreshortened sectional view, taken along the line 3—3 in FIG. 2.

FIG. 4 is a fragmentary, sectional view, taken along the line 4—4 in FIG. 2.

FIGS. 5–9 are views in side elevation, some wholly and others partially broken away, of the charcoal lighter showing sequential steps in its operation.

DESCRIPTION OF THE PREFERRED EMBODIMENT

Referring to FIG. 1, the charcoal lighter includes tubular housing 10, having a thin-walled cylindrical cross section and forming a flue. The housing preferably is constructed of a temperature resistant, light weight sheet material, such as aluminum, steel, or other suitable material. Although the dimensions of the housing may be varied over a wide range, a typical effective housing is 12 inches long and 6 inches in diameter.

Means in the form of a grate 12 is provided within the housing for supporting charcoal to be lighted. It is configured to fit loosely within the tubular housing. Its diameter preferably should be approximately 70–80% that of the housing so that it may be tipped vertically against the housing side wall. In the embodiment illustrated, it comprises a flat annulus 14 and a plurality of spaced, parallel, flat bars 16 joined thereto. Projecting outward from the annulus are a plurality of tabs 18 provided with central openings 20. In the embodiment illustrated, three such tabs are provided at 120° intervals about the annulus. The grate conveniently and economically is stamped from a single, flat plate and incorporates the tabs 18 and openings 20 integrally therewith.

Means is provided for supporting the grate removably within the housing, for ease of cleaning, and also for tilting the grate downwardly to discharge lighted charcoal to the base of an underlying grill G. In the illustrated embodiment, such means includes elongated hanger rods 22 having their lower ends bent to form eyes 24 which extend through openings 20 to pivotally join the grate tabs 18 thereto, as shown in detail in FIG. 3. The hanger rods preferably are of a length approximately one-half that of tubular housing 10.

The upper portions of two of the hanger rods 22 are reversely bent to form clips 26 for frictionally gripping the upper edge of the housing 10. Finger grips 28, at the outer edges of these hangers, angle outwardly to allow finger engagement therebeneath, to facilitate removal of the clips from the housing.

The third hanger 22' functions to releasably support the grate for tilting, and includes an upper hook portion 30 which is bent outwardly at an acute angle to form hook pocket 32. This hook portion extends outwardly a short distance and then is angled upward substantially parallel to the hanger rod to form a terminal portion 34. This hanger rod 22' is pivotally joined with the third tab 18 on grate 12.

If it is desired to use the charcoal lighter as a miniature grill, a small grill 36 may be installed on the top of tubular housing 10. In the embodiment illustrated, it includes an annular ring 38 configured to fit over clips 26 and the opposed top portion of tubular housing 10. When installed on the clips, the ring engages them slightly below their maximum outward surface to allow over-center frictional engagement, as shown in particular in FIG. 3. Thus, the grill ring is securely installed on the housing, and cannot become accidentally dislodged.

A plurality of bars 40 are mounted parallel to one another at spaced intervals on top of ring 38. The bars are joined to the ring as by welding. A transverse central bar 40' underlies and is welded or otherwise secured to bars 40 to prevent foods from falling downward through the spacing between adjacent bars 40.

Slot 42 (FIG. 2), of a dimension to allow the upper hook portion 30 of releasing hanger rod 22' to pass therethrough is included in ring 38. It is positioned substantially centrally between the two middle bars 40.

Means is provided for locking the hook portion 30 against disengagement from the upper edge of the housing 10 when the grill 36 is in use. In the embodiment illustrated, this is provided by the lateral extension 44 which interconnects the two middle bars 40 of the grill, as shown in FIGS. 2 and 4. Thus, when the grill is installed, the terminal end portion 34 of the rod 22' engages the abutment 44 to prevent disengagement of the hook portion 30 from the upper edge of the housing 10. Accordingly, the releasing hanger rod cannot be released from its grate-supporting position overlying the upper edge of the housing 10.

Draft means, such as at least one, and preferably a plurality of, arcuate cutouts 46, are included in the lower portion of the tubular housing. As illustrated, they are located at peripherally spaced positions at the bottom edge of the housing to provide large draft openings defining spaced support legs therebetween.

Openings 50 are located at the top portion of the tubular housing to allow insertion of a rod, barbeque fork, or other lifting device 52 (FIG. 8) for moving the charcoal lighter when it is hot.

The operation of the charcoal lighter described hereinbefore is best illustrated in FIGS. 5–8. First, grate 12 is positioned within the tubular housing by placing clips 26 of the hanger rods 22 and hook pocket 32 of the releasing hanger rod 22' over the top edge of tubular housing 10. It will be noted that when the hanger rods are all engaged with the housing, the grate 12 is disposed in a raised, substantially horizontal position. Crushed paper 48 is inserted into the bottom portion of the housing and the latter then is placed upon the base of a main grill G, as shown in FIG. 5.

As illustrated in FIG. 6, charcoal 56 is then placed on top of the grate 12. The paper is lighted, as by means of a match. The burning paper, aided by the flue effect of the housing and draft through the draft openings 46, provides an intense flame for sufficient time to insure that the charcoal becomes ignited. The aforesaid flue effect then insures that the ignited charcoal will reach its maximum temperature more rapidly than with an open stack of charcoal as is commonly employed.

After the charcoal reaches its maximum temperature, releasing hanger rod 22' is released from the housing, as shown in FIG. 7. To do this, the user need only place a barbeque fork, or other convenient tool, under the upper hook portion 30 and lift the hanger rod upwardly and inwardly to clear the housing. Alternatively, the tool may be placed against the outer, upright end portion 34 and force applied to slide the portion 30 inward over the upper edge of the housing 10. In either event, upon release of the releasing hanger rod 22', the grate 12 swings downward, about the pivot axes of the eyes 24 of rods 22, until the grate is disposed in the lowered, substantially vertical, position shown in FIG. 7. The lit charcoal thus is discharged from grate 12 and is deposited on the base of main grill G.

The charcoal lighter then is removed from the grill base, as shown in FIG. 8, by inserting a lifting device 52 in openings 50 to aid in lifting the lighter without touching the hot housing.

If it is desired to utilize the charcoal lighter as a miniature grill, the grate 12 is left in the raised position and small grill 36 installed, as shown in FIG. 9. In this arrangement, the lit charcoal remains at its maximum temperature during the cooking. This effect, coupled with the proximity of the charcoal to the grill, provides an extremely hot cooking source which is particularly advantageous for searing meat in order to contain its juices.

When the grill 36 is installed, its over-center engagement with the clips 26 of hanger rods 22 prevents inadvertent removal of both the grill and of the hanger rods.

Inadvertent release of releasing hanger rod 22' is also prevented by abutment of terminal end portion 34 with the locking extension 44, as illustrated in FIG. 4 and as described hereinbefore.

It will be apparent to those skilled in the art that various changes may be made in the size, shape, type, number and arrangement of the parts described hereinbefore without departing from the spirit of this invention.

Having now described our invention and the manner in which it may be used, we claim:

1. A charcoal lighter comprising:
    a. a tubular housing,
    b. draft means in the lower portion of the tubular housing,
    c. grate means for releasably supporting charcoal thereon,
    d. hanger means including grate pivot means connected pivotally at the lower end thereof to the grate means for pivoting the grate means about a horizontal axis, and connected at the upper end thereof to the upper portion of the tubular housing for locating the grate means intermediate the ends of the housing,
    e. the hanger means including a grate-releasing hanger member connected pivotally at its lower end to the grate means at a position spaced from said horizontal axis and having a hook portion at its upper end releasably overlying the upper edge of the tubular housing, the grate-releasing hanger member being operable, when said hook portion overlies the upper edge of the housing, to support the grate means horizontally within the housing, and when said hook portion is released from said upper edge of the housing, to allow downward pivoting of the grate means about said horizontal axis to discharge charcoal therefrom.

2. The charcoal lighter of claim 1 wherein the grate pivot means comprises a pair of elongated rods connected pivotally at their lower ends to the grate means at peripherally spaced positions and having clamp means at their upper ends for engaging over the upper edge of the housing, the grate-releasing hanger member being connected at its lower end to the grate means at a position spaced peripherally from said elongated rods.

3. The charcoal lighter of claim 1 including a grill mounted removably on the upper edge of the housing, and lock means on the grill engageable with the hook portion of the grate-releasing hanger member when the hook portion overlies the upper edge of the housing, to prevent removal of said hook portion from said upper edge.

4. The charcoal lighter of claim 1 wherein the hanger means comprises:
    a. two grate pivot hanger rods having their upper portions reversely bent for clip-type frictional engagement with the upper edge of the tubular housing, and
    b. one grate-releasing hanger rod having its upper portion bent at an acute angle to form a hook pocket configured for releasable engagement with the upper edge of the tubular housing.

5. A charcoal lighter comprising:
    a. a tubular housing,
    b. draft means in the lower portion of the tubular housing,
    c. grate means, d. hanger means comprising two hanger rods connected pivotally at their lower ends to the grate means and having their upper ends reversely bent for clip-type frictional engagement with the upper edge of the tubular housing for locating the grate means intermediate the ends of the housing, and one releasing hanger rod connected at its lower end to the grate means and having its upper portion bent at an acute angle to form a hook pocket configured for releasable engagement with the upper edge of the tubular housing, the releasing hanger rod being operable, when said hook pocket overlies the upper edge of the housing, to support the grate means horizontally within the housing and when said hook portion is released from said upper edge of the housing to allow downward pivoting of the grate means to discharge charcoal therefrom, and e. a grill mounted removably on the upper edge of the tubular housing, the grill including
  1. an annular ring configured to fit over the reversely bent portion of the hanger rods for over-center frictional engagement therewith.
  2. narrow slot through one portion of the annular ring to receive freely therethrough the hook portion of the releasing hanger rod, and
  3. locking means on the grill arranged to engage said hook portion when the latter engages the upper edge of the housing.

6. The combination of claim 5 wherein the locking means comprises an abutment on the grill spaced outwardly from the edge of the tubular housing in position for engagement by the hook portion of the releasing hanger rod.

* * * * *